May 15, 1923.
F. RIST
CONVERTIBLE VEHICLE
Filed July 3, 1922
1,454,861
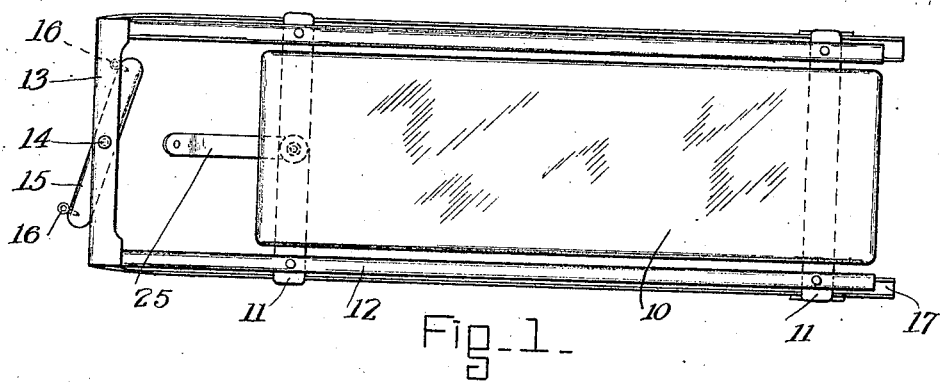
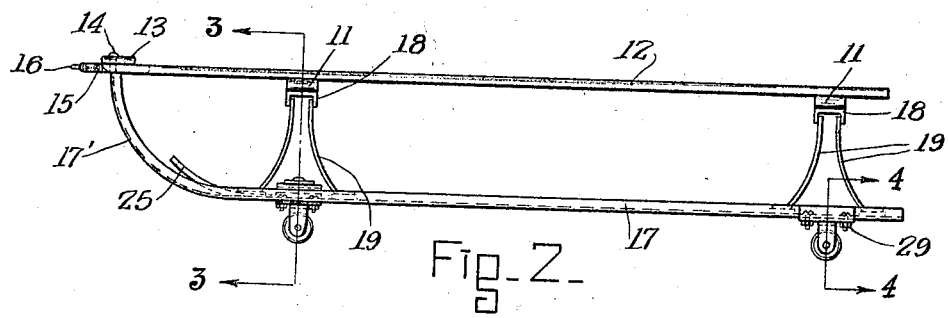
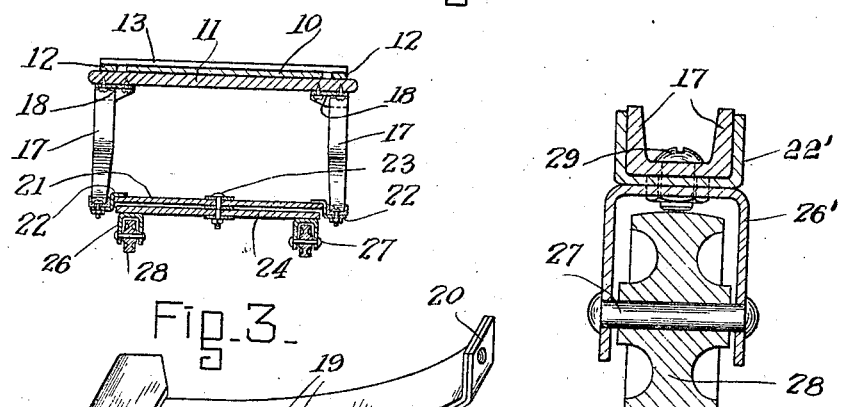
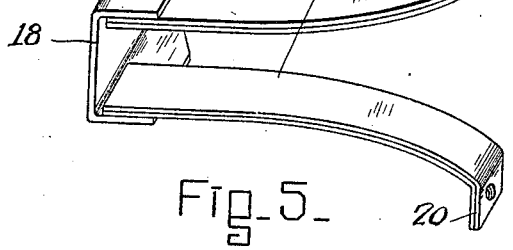
INVENTOR
FRANK RIST
BY
*Marvin Lahmé*
ATTORNEY Patented May 15, 1923.

1,454,861

UNITED STATES PATENT OFFICE.

FRANK RIST, OF BROOKLYN, NEW YORK.

CONVERTIBLE VEHICLE.

Application filed July 3, 1922. Serial No. 572,392.

*To all whom it may concern:*

Be it known that I, FRANK RIST, a citizen of the United States, residing at Brooklyn, in the county of Kings and State of New York, have invented certain new and useful Improvements in Convertible Vehicles, of which the following is a specification.

This invention relates to vehicles, of the sled or sleigh type, as used in coasting down hill by children and others, and has as one of its objects to provide means whereby the runners of the sled may be supplied with wheels in an easy and rapid manner.

A further purpose is to produce a sled having a raised platform, and a pair of fixed runners to which may be engaged attachments carrying free running support wheels on which the vehicle rests as firmly and securely as if an integral part of the structure.

These and similar aims are secured by the novel construction, combination and arrangements of parts hereinafter described and shown in the accompanying drawing, forming a material part of this disclosure, and in which:—

Figure 1 is a plan view showing an embodiment of the invention.

Figure 2 is a side elevational view of the same.

Figure 3 is a transverse sectional view taken on line 3—3 of Figure 2.

Figure 4 is a sectional view taken on line 4—4 of Figure 2 drawn to an enlarged scale.

Figure 5 is a perspective of one of the platform supports.

The platform of the sled as shown in the drawing, is designated by the numeral 10 and consists of a level oblong rectangular plate resting on cross pieces 11 at each end.

Secured on the ends of the cross-pieces are rails 12 extended towards the front where they are connected by a cross-bar 13, below which, pivoted on the pin 14 at the center, is a draft-bar 15 having eyes 16 at its ends for engaging ropes or the like.

The runners 17, below the rails 12, are upturned at their forward ends 17′ and secured to said rails at their forward extremities as shown in Figure 2.

Secured to the lower surfaces of the cross-bars 11, at their ends, are brackets 18 in which are received the upper ends of laminated spring supports 19, spread at their lower ends, flanged as at 20 and provided with openings for bolts by which they are secured to the upper surfaces of the runners, the same being preferably of channel section as best shown in Figure 4.

At the front end of the sled a transverse plate 21 is removably engaged to the runners by connecting brackets 22, this plate carrying a central pivot bolt 23 by which is attached a swivel plate 24 in such manner that the brackets 22 may be released easily when desired.

A steering bar 25 is fixed to the plate 24 at its center and at its ends are engaged U shaped brackets 26 carrying pivot pins 27 on which are freely mounted rollers or wheels 28, similar brackets 26′ being secured to the runners at the rear by the bolts 29, the same passing through short channels 22′ in which the rear ends of the runners rest.

When the device is used as a sled, the brackets 18, 22 and 22′ are removed, leaving the runners free to perform their usual function.

The application of the wheels in the manner stated converts the device into a wheeled vehicle in an obvious manner.

Having thus described my invention, what I claim as new and desire to secure by Letters Patent, is:

1. A vehicle comprising a platform, a pair of runners, curved, flat, leaf-spring supports interposed therebetween, a cross bar extending between said runners near the front thereof, a narrow plate pivoted centrally to said bar on the under side thereof, a steering bar rigidly extending to the front from said plate, wheels carried at the outer ends of said plate adjacent the runners, and a pair of wheels removably engaged with said runners at the rear.

2. A vehicle comprising a platform, a pair of runners, spring supports interposed therebetween, a pair of wheels removably engaged at the rear ends of said runners, a plate removably engaged near the front of said runners, means permitting said plate to swivel, and wheels at the ends of said plate.

In witness whereof I affix my signature.

FRANK RIST.